(12) United States Patent
Fuechtling et al.

(10) Patent No.: US 11,109,529 B2
(45) Date of Patent: Sep. 7, 2021

(54) HEIGHT CONTROL SYSTEM FOR A FRONT HARVESTING ATTACHMENT

(71) Applicant: CLAAS Selbstfahrende Erntemaschinen GmbH, Harsewinkel (DE)

(72) Inventors: Christian Fuechtling, Rinkerode (DE); Andreas Wielenberg, Herford (DE); Udo Beschorn, Harsewinkel (DE); Thomas Hinz, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 298 days.

(21) Appl. No.: 16/353,052

(22) Filed: Mar. 14, 2019

(65) Prior Publication Data

US 2019/0297775 A1 Oct. 3, 2019

(30) Foreign Application Priority Data

Apr. 3, 2018 (DE) .................. 10 2018 107 804.8

(51) Int. Cl.
*A01D 34/28* (2006.01)
*A01D 34/04* (2006.01)
(Continued)

(52) U.S. Cl.
CPC ........... *A01D 34/283* (2013.01); *A01D 34/04* (2013.01); *A01D 34/14* (2013.01); *A01D 41/141* (2013.01);
(Continued)

(58) Field of Classification Search
CPC ...... A01D 34/283; A01D 34/04; A01D 34/14; A01D 41/141; A01D 41/14; A01D 41/145; A01D 34/246
See application file for complete search history.

(56) References Cited

U.S. PATENT DOCUMENTS 4,332,126 A * 6/1982 Van Auwelaer ..... A01D 41/141
56/10.2 R
4,573,308 A * 3/1986 Ehrecke ................ A01D 41/14
56/14.4
(Continued)

FOREIGN PATENT DOCUMENTS

EP 2695511 A1 2/2014
EP 3 087 819 A2 11/2016

OTHER PUBLICATIONS

European Search Report dated Aug. 23, 2019 (with English translation of relevant parts).

*Primary Examiner* — Arpad Fabian-Kovacs
(74) *Attorney, Agent, or Firm* — Collard & Roe, P.C.

(57) ABSTRACT

A height control system for a front harvesting attachment, comprising a frame, at least one crop pick-up device, and a ground-conforming cutterbar which is situated on a plurality of supporting arms that can pivot about a horizontal axis and are articulated on the frame. The supporting arms can be pivoted, originating from a desired position to be set before the start of a harvesting operation, between an upper end position, which delimits a deflection of the supporting arms in the direction of the crop pick-up device, and a lower end position, wherein the upper end position has a first clearance and the lower end position has a second clearance from the desired position, wherein the desired position can be adapted, during the harvesting operation, to changing harvesting conditions and/or operating conditions depending on a deflection of the cutterbar, in order to minimize the first clearance and maximize the second clearance.

15 Claims, 4 Drawing Sheets

(51) Int. Cl.
*A01D 34/14* (2006.01)
*A01D 41/14* (2006.01)
*A01D 34/24* (2006.01)

(52) U.S. Cl.
CPC ............ *A01D 34/246* (2013.01); *A01D 41/14* (2013.01); *A01D 41/145* (2013.01)

(56) References Cited

U.S. PATENT DOCUMENTS

| | | | |
|---|---|---|---|
| 7,478,521 B2* | 1/2009 | Coers | A01D 61/002 56/208 |
| 7,640,720 B1* | 1/2010 | Lovett | A01D 57/20 56/181 |
| 7,805,921 B2* | 10/2010 | Coers | A01D 41/141 56/364 |
| 7,937,919 B2* | 5/2011 | Coers | A01D 61/002 56/15.8 |
| 8,245,489 B2 | 8/2012 | Talbot | |
| 9,148,998 B2 | 10/2015 | Bollin et al. | |
| 9,668,412 B2* | 6/2017 | Ritter | A01D 41/141 |
| 10,462,968 B2* | 11/2019 | Shearer | A01D 57/20 |
| 2006/0254232 A1* | 11/2006 | Bomleny | A01D 41/141 56/10.2 E |
| 2008/0078155 A1* | 4/2008 | Coers | A01D 41/141 56/15.8 |
| 2008/0271426 A1* | 11/2008 | Lohrentz | A01D 41/14 56/153 |
| 2008/0276590 A1* | 11/2008 | Sauerwein | A01D 41/14 56/153 |
| 2009/0069988 A1* | 3/2009 | Strasser | A01D 41/141 701/50 |
| 2009/0277144 A1* | 11/2009 | Honas | A01D 41/14 56/153 |
| 2009/0277145 A1* | 11/2009 | Sauerwein | A01D 41/141 56/208 |
| 2009/0277146 A1* | 11/2009 | Sauerwein | A01D 34/13 56/208 |
| 2009/0277147 A1* | 11/2009 | Honas | A01D 57/20 56/208 |
| 2009/0288383 A1* | 11/2009 | Sauerwein | A01D 57/20 56/181 |
| 2009/0293441 A1* | 12/2009 | Sauerwein | A01D 41/14 56/208 |
| 2010/0077712 A1* | 4/2010 | Nathan | A01D 41/141 56/10.2 E |
| 2010/0083629 A1* | 4/2010 | Klotzbach | A01D 41/14 56/320.1 |
| 2018/0168101 A1* | 6/2018 | Fuchtling | A01D 34/04 |
| 2018/0228080 A1* | 8/2018 | Fay, II | A01D 47/00 |
| 2018/0228086 A1* | 8/2018 | Cook | A01D 34/28 |
| 2019/0029174 A1* | 1/2019 | Talbot | A01D 41/145 |

\* cited by examiner

HEIGHT CONTROL SYSTEM FOR A FRONT HARVESTING ATTACHMENT

CROSS-REFERENCE TO RELATED APPLICATIONS

This application claims priority under 35 USC 119 of German Application No. 102018107804.8, filed on Apr. 3, 2018, the disclosure of which is herein incorporated by reference.

BACKGROUND OF THE INVENTION

The present invention relates to a height control system for a front harvesting attachment. The present invention also relates to a method for operating a front harvesting attachment and to a self-propelled harvesting machine. With the aid of a height control system, a front harvesting attachment designed, in particular, as a header, comprising a ground-conforming cutterbar, is moved over a territory to be worked, wherein the cutterbar follows the contour of the ground. For this purpose, the cutterbar is situated on a plurality of supporting arms which are pivotable about at least one horizontal axis and are articulated on a frame of the front harvesting attachment. The cutterbar itself rests on the ground to be tracked, while the frame of the front harvesting attachment is held by a self-propelled harvesting machine so as to be spaced from the ground. Before the start of the harvesting operation, a desired position of the supporting arms relative to the frame is set, which allows for a deflection of the supporting arms and of the cutterbar situated on the supporting arms in essentially the vertical direction. In this way, each supporting arm can carry out a compensation movement as a result of an existing unevenness of the ground to be worked, for example, in the form of a depression or a raised area. For this purpose, the supporting arm is pivoted, originating from the preset desired position, between an upper end position which delimits a deflection of the supporting arms in the direction of a crop pick-up device of the front harvesting attachment, which is designed, in particular, as a reel, and a lower end position, wherein the upper end position has a first clearance from the desired position and the lower end position has a second clearance from the desired position. The deflection of a single supporting arm to the point at which the upper end position or the lower end position is reached affects the load on the front harvesting attachment differently. If, for example, a single supporting arm reaches the lower end position due to the depth of a depression, the result thereof is that the cutterbar of this supporting arm temporarily loses ground contact, while the sections of the cutterbar adjacent thereto, i.e., the adjacent supporting arms, continue to be supported on the ground. On the other hand, in the event of a deflection of a single supporting arm to the point at which the upper end stop has been reached, due to a raised area, the height of which exceeds the first clearance, this single supporting arm begins to be increasingly forced to support the weight of the front harvesting attachment, which can result in an uncontrolled overload. Therefore, the desired position is set at a preferred value which generally corresponds to an approximately uniform allocation of the first clearance and the second clearance. This allocation ensures that the cutterbar has sufficient travel in order to be able to move upwardly in reaction to uneven ground without hastily risking becoming overloaded. The deflection of the supporting arms is determined not only by the ground condition of the territory to be worked, but also by operating conditions under which the front harvesting attachment is moved by the harvesting machine over the territory. Therefore, in particular, high ground speeds bring about a strong deflection of the cutterbar or the supporting arm or the supporting arms in the direction of the upper end stop.

A height control system for a header of the type mentioned above is known from EP 2 695 511 B1. In this case, the height control system controls the header according to an algorithm depending on a height signal in order to maintain a desired height of travel which has been preset by an operator.

SUMMARY OF THE INVENTION

Originating from the aforementioned related art, the problem addressed by the present invention is that of providing a height control system for a front harvesting attachment of the type mentioned above, as well as a method for operating a height control system, which are distinguished by an improved control of the desired position.

This problem is solved, according to the invention, by a height control system for a front attachment, in particular a belt cutting unit, which comprises a frame, at least one crop pick-up device, and a ground-conforming, flexible cutterbar. The ground-conforming cutterbar is situated on a plurality of supporting arms which are pivotable about at least one horizontal axis and are articulated on the frame. In order for the cutterbar to follow the contour of the ground during the ground tracking, the supporting arms are pivotable, originating from a desired position to be set before the start of a harvesting operation, between an upper end position which delimits a deflection of the supporting arms in the direction of the reel, and a lower end position. In this case, the upper end position has a first clearance from the desired position and the lower end position has a second clearance from the desired position. In order to improve the control of the desired position, the desired position is adaptable, during the on-going harvesting operation, to changing harvesting conditions and/or operating conditions depending on a deflection of the cutterbar, in order to minimize the first clearance and maximize the second clearance. The term "harvesting conditions" refers, in particular, to the ground condition, i.e., the ground contour, of the territory to be worked. An adaptation of the preset desired position can be carried out during the on-going operation with the aid of the height control system in order to be able to respond, to a greater extent, to an undulating portion of the territory to the worked, by changing the desired position, i.e., reducing the first clearance. It is of primary importance that any occurrence of an overload of the cutterbar due to an uncontrolled, repeated deflection into the upper end position is avoided during the adaptation of the desired position.

This adaptation of the desired position can take place autonomously, i.e., without any additional effort by an operator. The operator can therefore concentrate fully on the harvesting operation.

Preferably, the adaptation of the desired position can take place cyclically during the on-going harvesting operation. For this purpose, the movement of the flexible cutterbar can be detected at certain time intervals and the particular maximum deflection of the cutterbar can be classified. In this way, it can be determined whether overloads are present or whether there is potential for optimizing the desired position for more flexibility of the cutterbar.

In particular, the first clearance between the desired position and the upper end position should be selected to be that much greater than the original deflection of the cutterbar due to uneven ground. In this way, the first clearance is formed as a safety margin in order to avoid an uncontrolled overload of the cutterbar.

According to a preferred refinement, the ratio of the first clearance and of the second clearance with respect to one another relative to the desired position to be set before the start of a harvesting operation can be approximately 1:1 to 1:1.5. In this way, at least an essentially equal first clearance and second clearance can be set before the start of the harvesting operation, which initially represents a compromise between the required safety margin, on the one hand, and the necessary flexibility, on the other hand, on a territory to be worked.

Particularly preferably, the first clearance can be approximately 90 mm to 115 mm, which is set before the start of the harvesting operation.

With the aid of the height control according to the invention, the first clearance can be reduced to approximately 40 mm during the on-going harvesting operation. The second clearance between the desired position and the lower end position is therefore maximized, which is advantageous in terms of the usable flexibility during travel over depressions or the like in the undulating terrain. Nevertheless, a sufficient safety margin remains, in order to prevent damage to the front harvesting attachment. Due, in particular, to the cyclic adaptation of the desired position, continuous monitoring of the adaptation is carried out in order to avoid overloads which occur unnoticed by the operator.

In particular, at least one sensor system can be situated on the front harvesting attachment for detecting the deflection of the cutterbar during the on-going harvesting operation. With the aid of the at least one sensor system, the direction and the degree of the deflection of the supporting arms, which occurs during the ground tracking, can be detected. It is conceivable that more than one sensor system is provided. In particular, a sensor system can be situated on each supporting arm, which is configured for detecting the particular deflection of the supporting arm.

Preferably, the at least one sensor system can be designed as at least one shaft which is rotatably mounted in a bearing point and extends, at least in sections, in parallel to the frame, wherein the shaft is connected to the particular supporting arm by a lever system in each case, and the shaft is connected to at least one sensor for detecting the rotary motion conveyed by the lever system onto the shaft. The at least one sensor can be designed, for example, as a contactlessly operating rotation-angle sensor or as a potentiometric rotation-angle sensor.

A type of freewheel can be provided at every bearing point, with the aid of which a rotary motion of the shaft is conveyed only as a result of a deflection of the particular supporting arm in the direction of the upper end stop. For this purpose, the lever system can be designed for conveying the deflection of the supporting arm onto the shaft only as a result of a deflection in the direction of the upper end stop. Therefore, only those deflections of the supporting arms in the direction of the upper end stop that can be critical for the operation of the header are detected. In addition, the magnitude of the signals to be processed can therefore be reduced in a simple way.

In particular, a control device can be assigned to the front harvesting attachment, which is configured for evaluating the deflection detected by the at least one sensor system and for adaptably adjusting the desired position. The control device includes a processing unit as well as a memory unit. An actuator system, in particular a hydraulic cylinder, which is situated on the particular supporting arm, can be controlled with the aid of the control device. The actuator system can be utilized for initially setting the desired position of the cutterbar at the start of the harvesting operation. The front harvesting attachment can be transferred into an operating mode, in which the cutterbar rests on the undulating terrain with a proportional share of weight, which depends on the pressurization. During the on-going operation, the actuator system of the supporting arms can be controlled with the aid of the control device in order to adapt the desired position of the cutterbar by changing the first clearance to the upper end stop. The control device evaluates the signals transmitted by the at least one sensor system, in order to determine a time-dependent profile of the deflection. Preferably, only that signal can be utilized, which corresponds to the greatest deflection of a supporting arm at the point in time of the measurement. As a result, the number of sensors utilized for detecting the rotary motion of the shaft can be minimized, since only the maximum deflection of the supporting arms is to be detected. For this purpose, the movement of the flexible cutterbar can be detected at certain time intervals and the particular maximum deflection of the cutterbar can be classified. In this way, it can be determined whether overloads are present or whether there is potential for optimizing the desired position for more flexibility of the cutterbar. The on-going operation of the front harvesting attachment can be monitored with the aid of the control device, and so situations, in which a deflection of the cutterbar against the upper end stop can occur due to the ground conditions, can be responded to by adapting the desired position, by way of increasing the first clearance, if necessary. The control device can preferably be situated directly on the front harvesting attachment.

The invention also relates to a method for operating a height control system for a front harvesting attachment, in particular a belt cutting unit, wherein the front harvesting attachment comprises a frame, at least one crop pick-up device, and a ground-conforming cutterbar which is situated on a plurality of supporting arms which are pivotable about at least one horizontal axis and are articulated on the frame. The supporting arms are pivoted during the harvesting operation, originating from a desired position which was set before the start of a harvesting operation, between an upper end position which delimits a deflection of the supporting arms in the direction of the reel, and a lower end position, wherein the upper end position has a first clearance from the desired position and the lower end position has a second clearance from the desired position. According to the invention, the desired position is adapted, during the on-going harvesting operation, to changing harvesting conditions and/or operating conditions depending on a deflection of the cutterbar, in order to minimize the first clearance and maximize the second clearance. The term "operating condition" is understood to mean, in particular, the driving manner, in particular the ground speed of a self-propelled harvesting machine, on which the front harvesting attachment, including its ground-conforming cutterbar, is situated, and which guides the front harvesting attachment over the undulating terrain. The method according to the invention offers the possibility of minimizing the first clearance between the desired position and the upper end position when the preconditions therefor are present. The operation of the front harvesting attachment using fixed settings, as is provided in the related art, is replaced in the method according to the invention in favor of a flexible adaptation of the desired position.

In this way, the deflection of the cutterbar can be cyclically detected with the aid of at least one sensor system and can be evaluated by a control device in order to minimize the first clearance from the desired position depending on the deflection in the direction of the upper end position. Therefore, there is no need for active monitoring by an operator. In this way, the desired position can be initially predefined with the aid of the control device by the operator before the start of the harvesting operation, while the desired position can be cyclically adapted during the on-going harvesting operation depending on the particular deflection of the cutterbar, which is brought about by the harvesting conditions and/or operating conditions. The method makes it possible to set the desired position in an optimized way in order to ensure a deflection, which is as great as possible, in the direction of the lower end stop while avoiding an overload of one or multiple supporting arms.

For this purpose, the first clearance from the desired position can be selected to be that much greater, the more uneven the territory to be worked is. The method allows for an automatic response to changing harvesting conditions in order to ensure a safe operation of the header.

In particular, a degree of unevenness of a territory to be worked can be inferred on the basis of the detected deflection.

Moreover, the invention also relates to a self-propelled harvesting machine, in particular a combine harvester, comprising a front harvesting attachment that can be controlled by a height control system as described above.

BRIEF DESCRIPTION OF THE DRAWINGS

The present invention is explained in greater detail in the following with reference to an exemplary embodiment depicted in the drawings. In the drawings.

DETAILED DESCRIPTION OF THE EMBODIMENTS

Figure 1:
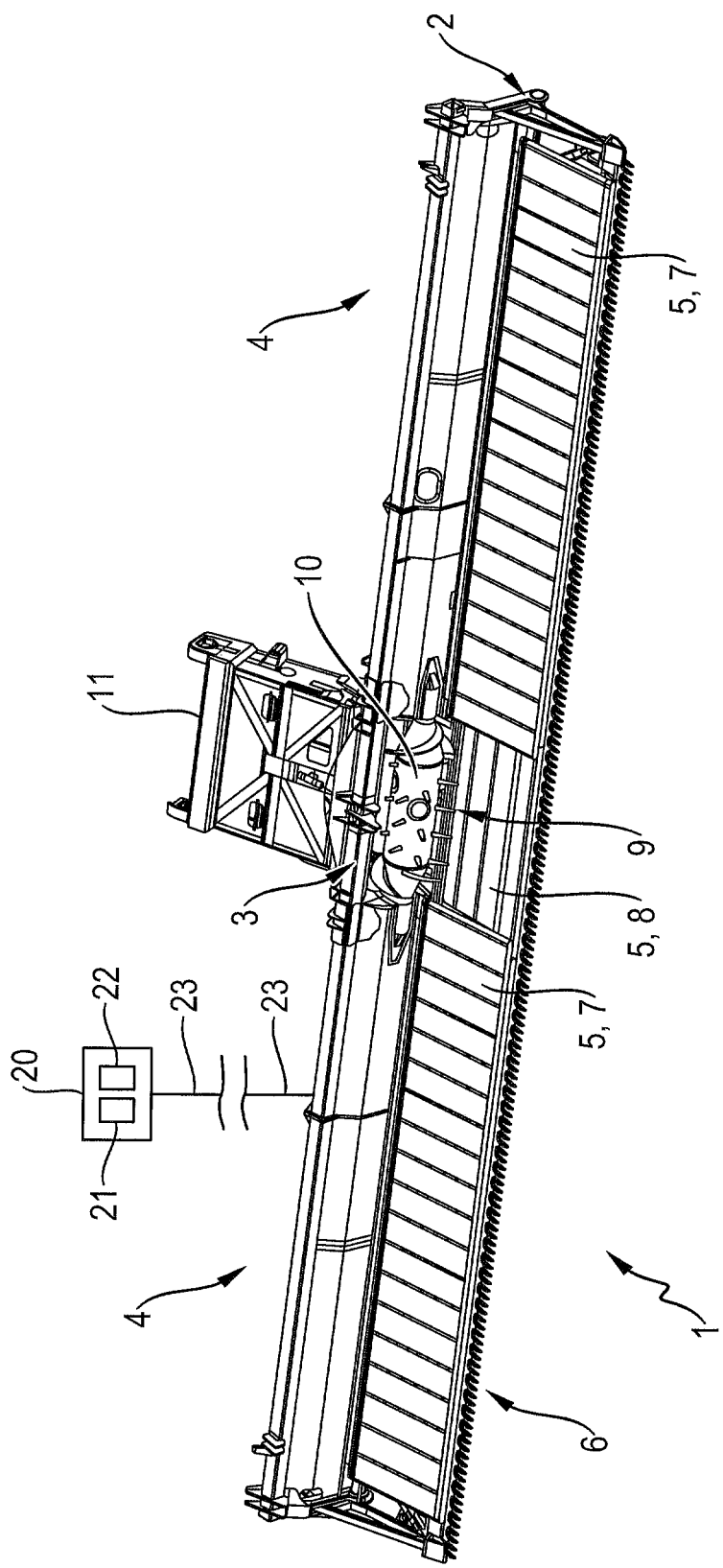
FIG. 1 shows a schematic view of a header.

The representation in FIG. 1 shows a schematic representation of a front harvesting attachment designed as a header 1. The header 1 is designed as a belt cutting unit. The header 1 comprises a frame 2 on which a middle section 3 and at least two side sections 4 adjacent to the middle section 3 are situated. A ground-conforming cutterbar 6, which extends essentially across the entire width of the header 1, is situated on the middle section 3 and the side sections 4 on the front side of the header 1 opposite the frame 2. Crop pick-up devices (not represented) designed as reels are situated on the frame 2 of the header 1 and extend essentially across the width of one side section 4 and partially across the width of the middle section 3. The reels are utilized for improving the pick-up of the crop by the header 1.

The crop cut by the cutterbar 6 is fed to a conveyor device 5 situated behind the cutterbar 6. The conveyor device 5 is designed as at least one endlessly circulating belt 7 on the particular side sections 4, which circulates in parallel to the longitudinal axis of the header 1. The endlessly circulating belts 7 are situated adjacent to the middle section 3 in order to transport crop cut by the cutterbar 6 sideways in the direction of the middle section 3 and feed this crop to an intake conveyor mechanism 9. The middle section 3 likewise comprises a conveyor device 5 designed as an endlessly circulating conveyor belt 8. Other designs of the conveyor device 5 in the area of the middle section 3 are conceivable. The intake conveyor mechanism 9 is designed as a driveable feed roller 10. The intake conveyor mechanism 9 conveys the crop that has been delivered laterally to the middle section 3 by the endlessly circulating belts 7 and 8 to an opening which is provided in the frame 2 and is located behind the feed roller 10, through which opening the crop is fed via a feeder housing 11—which is located on a combine harvester (not represented) and to which the header 1 can be detachably attached—to the combine harvester for further processing.

Figure 2:
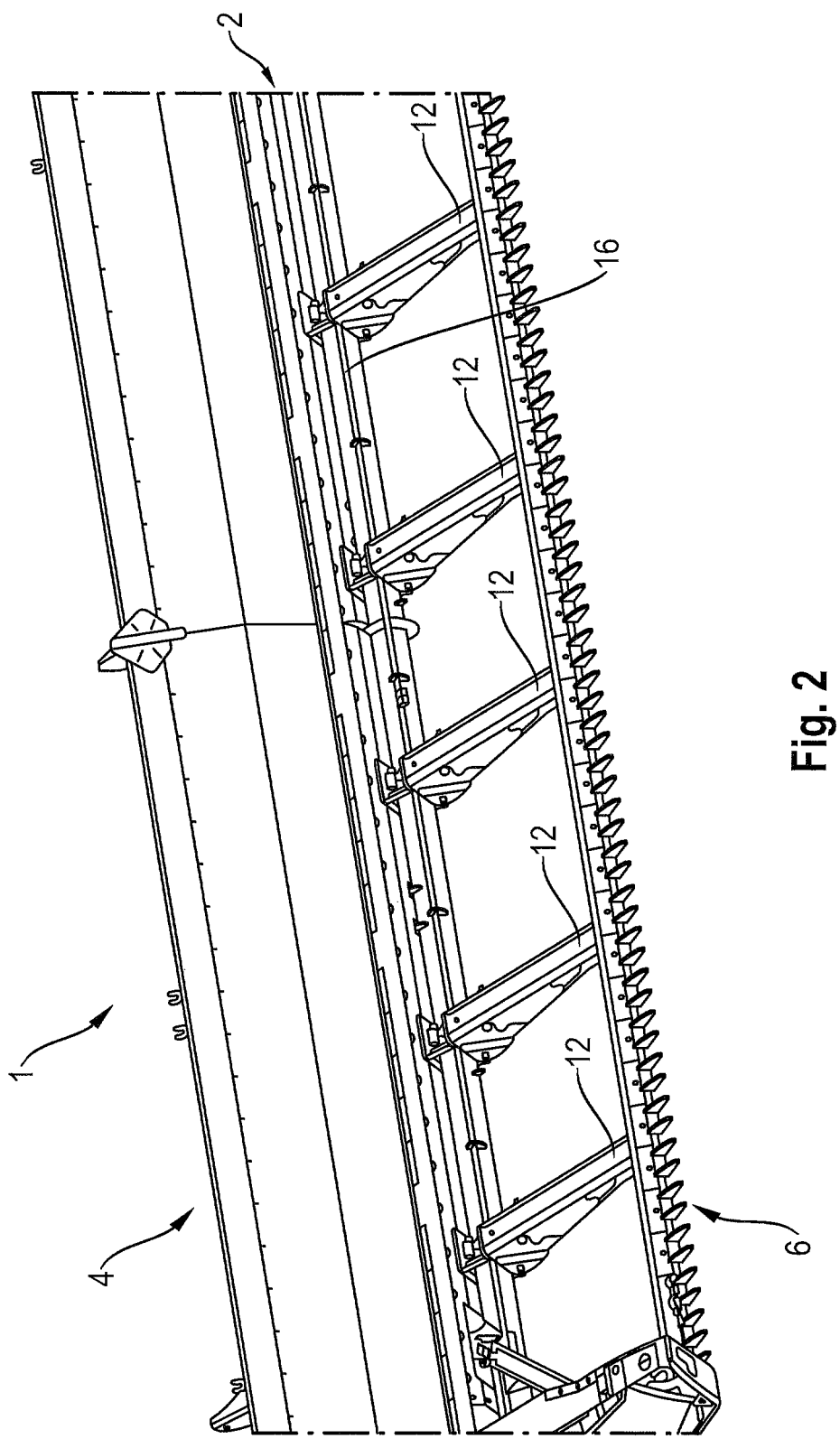
FIG. 2 shows a partial view of a side section of the header according to FIG. 1.

FIG. 2 shows a partial view of a side section 4 of the header 1 without the endlessly circulating conveyor belt 7 according to FIG. 1. The side sections 4 are designed with mirror symmetry, and so the following description can be transferred correspondingly to the other side section 4, provided the description relates to the represented side section 4 and components situated thereon. Each side section 4 comprises a plurality of supporting arms 12 which are pivotably articulated on the frame 2. A continuous shaft 16, which is a part of at least one sensor system 15 represented in greater detail in FIG. 3, extends across the width of the side section 4.

Figure 3:
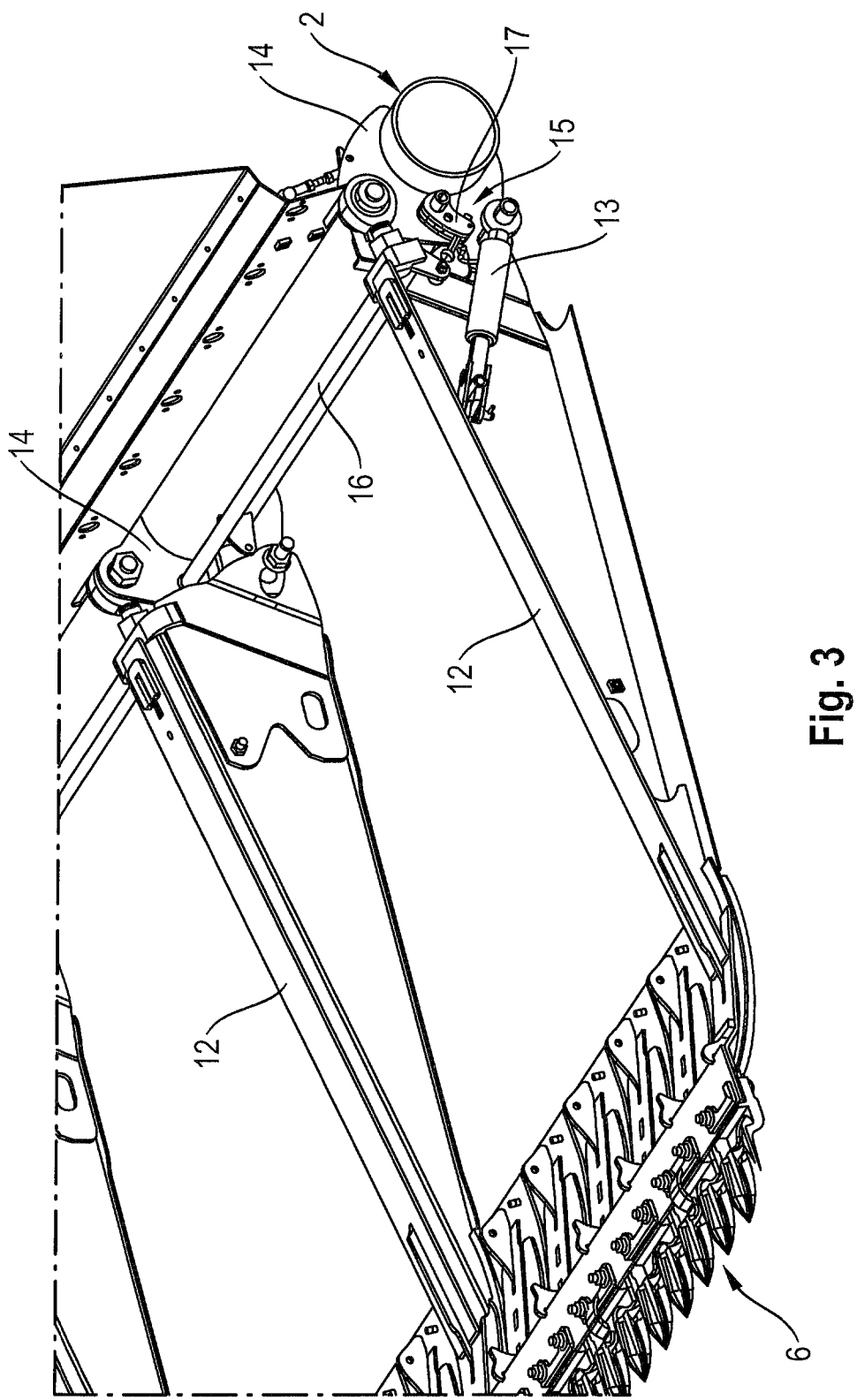
FIG. 3 shows a partial cutaway view of a supporting arm of the header.

The representation in FIG. 3 shows a partial cutaway view of a supporting arm 12 of the header 1. The supporting arms 12 are articulated on the frame 2 so as to be pivotable about a horizontal axis. The ground-conforming cutterbar 6 is situated on the supporting arms 12. An actuator system designed as a hydraulic cylinder 13 is assigned to each supporting arm 12. The particular supporting arm 12 can be operated, with the aid of the actuator system, in an operating mode, in which it is made possible for the cutterbar 6 to conform to undulating terrain. For this purpose, the hydraulic cylinders 13 are pressurized with a hydraulic pressure in such a way that the cutterbar 6 rests on the undulating terrain with a weight which depends on the pressurization. When there is a change in the ground contour, which the cutterbar 6 follows, at least in sections, the supporting arms 12 undergo a vertical deflection. The vertical deflection is determined with the aid of the sensor system 15.

The sensor system 15 is configured for detecting the pivoting movement of the supporting arms 12, which is induced by the vertical deflection of the cutterbar 6 when the header 1 is guided over the undulating terrain. The sensor system 15 comprises a continuous shaft 16 which extends essentially across the entire width of the particular side section 4. The shaft 16 is rotatably mounted in brackets 14 which are assigned to each supporting arm 12. Moreover, a lever system 17 is provided, with the aid of which the shaft 16 is connected to the particular supporting arm 12. The lever system 17 is utilized for conveying the deflection of the supporting arm 12 in the vertical direction onto the shaft 16 in the form of a rotary motion which can be detected with the aid of sensors. Due to the lever system 17, in the event of a change in position of the supporting arm 12, the deflection of the supporting arm 12 in the vertical direction is conveyed onto the shaft 16 and is transformed into a rotary motion. The greatest vertical deflection of a supporting arm 12 on a side section 4 results in the greatest rotation of the shaft 16.

The shaft 16 of the side section 4 is connected to at least one sensor (not represented) which is configured for detecting the rotary motion conveyed by the lever system 17 onto the shaft 16. Preferably, the at least one sensor is designed as a potentiometric sensor. It is also conceivable to design the at least one sensor as a contactless sensor, such as a Hall effect sensor.

As indicated in FIG. 1, a control device 20 is assigned to the header 1 and can be situated directly on the header 1 or on the combine harvester. The control device 20 comprises a processing unit 21 as well as a memory unit 22. The control device 20 is connected to the sensor system 15 by a signal line 23 in order to be able to receive signals, which have been acquired by the sensor system 15, and to be able to evaluate the signals with the aid of algorithms, which are stored in the memory unit 22, of the processing unit 21. Moreover, the control device 20 is configured for adjusting the hydraulic pressure which is applied to the hydraulic cylinder 13 of the supporting arms 12.

Figure 4B:
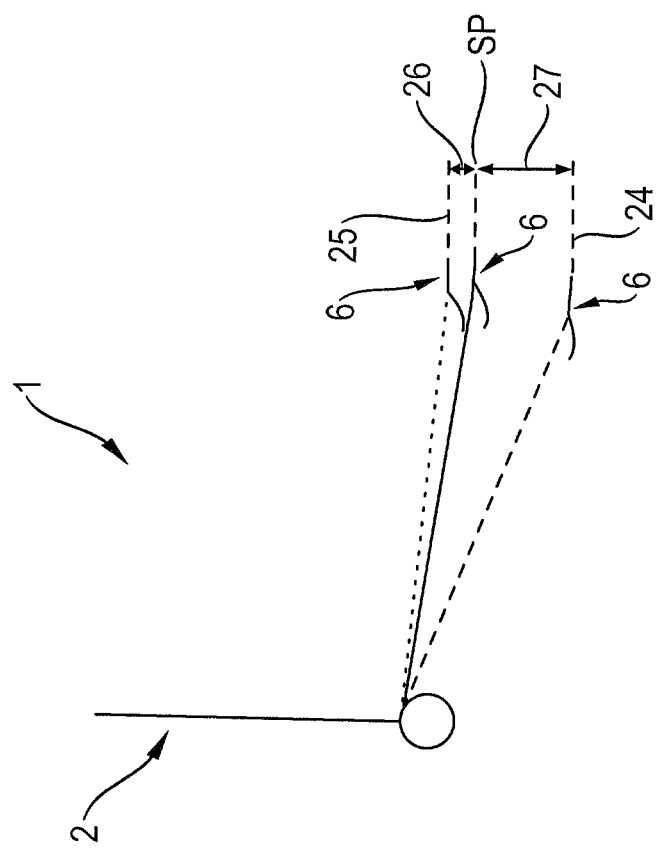
FIG. 4b shows a diagrammatic representation of the header in a side view, having a desired position of the supporting arms, which has been adapted during the harvesting operation.
Figure 4A:
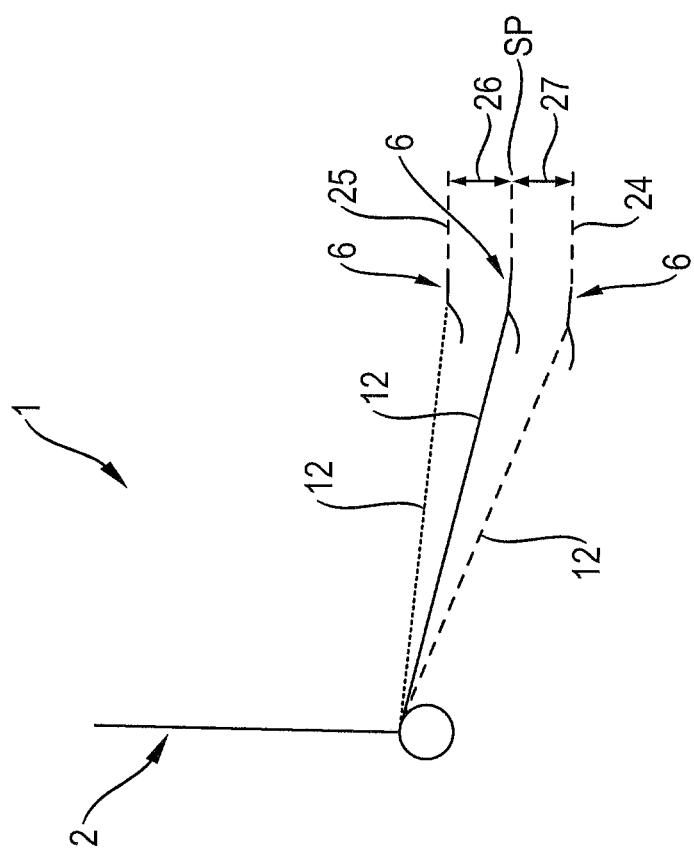
FIG. 4a shows a diagrammatic representation of the header in a side view, having a desired position of the supporting arms, which has been set before the start of a harvesting operation.

FIG. 4a shows a diagrammatic representation of the header 1 in a side view having a desired position SP of the supporting arms 12, which was set before the start of a harvesting operation. The desired position SP of the header 1 is set at the start of the harvesting operation. Due to the setting of the desired position SP, a first clearance 26 to an upper end stop 25 and a second clearance 27 to a lower end stop 24 of the supporting arms 12 are established. The lower end stop 24 and the upper end stop 25 delimit the maximum possible vertical deflection of the particular supporting arm 12 due to ground unevenness, such as raised areas or depressions, which the ground-conforming cutterbar 6 essentially follows. While deflections of a supporting arm 12 in the direction of the lower end stop 24 are comparatively non-critical with respect to the load which occurs, a deflection in the direction of the upper end stop 25 can represent a strong load which is to be taken into account by an appropriate adjustment of the first clearance 26 between the desired position SP and the upper end stop 25.

During a deflection of a supporting arm 12 in the direction of the lower end stop 24, often only one part of the cutterbar 6 hangs downward, while the supporting arms 12 adjacent thereto can continue to support proportional shares of the weight of the cutterbar 6, the supporting arms 12, and the belts 7 above the ground. On the other hand, a deflection of a supporting arm 12 in the direction of the upper end stop 25 due to a raised area, the height of which exceeds the first clearance, results in a strong loading of this supporting arm 12, since this supporting arm 12 must increasingly support the weight of the frame 2 of the header 1.

For the initial setting of the desired position SP, the ratio of the first clearance 26 and the second clearance 27 with respect to one another before the start of the harvesting operation is approximately 1:1 to approximately 1:1.5. An approximately uniform allocation of the total available displacement travel of the supporting arms 12 in the vertical direction is often implemented, as indicated in FIG. 4a. In this case, the supporting arm 12 is represented in the desired position SP with the aid of a solid line. The dotted or dashed representation of the supporting arm 12 shows the supporting arm 12 during a deflection up to the first end stop 25 or the lower end stop 24, respectively. Particularly preferably, the first clearance 26 can be approximately 90 mm to 115 mm, which is set before the start of the harvesting operation.

In order to optimize the setting of the desired position SP during the on-going harvesting operation, it is provided that the deflection of the supporting arms 12 is cyclically detected and evaluated by the control device 20. In so doing, the greatest vertical deflection of a supporting arm 12 detected by the at least one sensor system 15 of each side section 4 is detected in order to be able to infer the extent of the ground unevenness of a territory to be worked, as a harvesting condition. Moreover, an operating condition, in particular, a driving manner and/or ground speed of the combine harvester, by way of which the magnitude and frequency of the vertical deflection is influenced, can also be incorporated into the detection.

If it is established, within the scope of the cyclic evaluation of the vertical deflection of the supporting arms 12, that the harvesting and/or operating conditions permit an adaptation of the setting of the desired position SP, the control device 20 automatically changes the first clearance 26. In this case, the first clearance 26 is to be minimized in order to provide a maximum second clearance 27 in order to be able to better respond to undulating terrain. In addition, on the basis of the evaluation by the control device 20, the first clearance 26 between the upper end position 25 and the desired position SP can be selected to be that much greater, originating from the initial setting, the more uneven the territory to be worked is, in order to avoid the occurrence of overloads.

Due to the fact that the control device 20 is configured for autonomous operation, the operator of the combine harvester is relieved of the task of monitoring the header 1. The control device 20 automatically optimizes the adjustment of the desired position SP with consideration for harvesting and/or operating conditions. In addition to maximizing the second clearance 27, the method according to the invention ensures that a sufficient safety margin, i.e., the first clearance 26, remains ensured in order to avoid overloading the cutterbar 6 as a result of uncontrolled deflections.

The representation in FIG. 4b shows a diagrammatic representation of the header 1 in a side view having a desired position SP of the supporting arms 12, which has been adapted during the harvesting operation. Due to the adaptation of the desired position SP, the first clearance 26 has been minimized, while the second clearance 27 has been maximized. In this way, the first clearance 26 can be reducible to approximately 40 mm during the on-going harvesting operation.

LIST OF REFERENCE CHARACTERS 1 header
2 main frame
3 middle section
4 side section
5 conveyor device
6 cutterbar
7 belt
8 conveyor belt
9 intake conveyor mechanism
10 feed roller
11 feeder housing
12 supporting arm
13 hydraulic cylinder
14 bracket
15 sensor system
16 shaft
17 lever system
20 control device
21 processing unit
22 memory unit
23 signal line
24 lower end position 25 upper end position
26 first clearance
27 second clearance
SP desired position

What is claimed is:

1. A height control system for a front harvesting attachment, comprising:
a frame,
at least one crop pick-up device arranged on the frame, and
a ground-conforming cutterbar which is situated on a plurality of supporting arms that can pivot about at least one horizontal axis and are articulated on the frame,
wherein the supporting arms are connected to an actuator system that is designed to pivot the supporting arms, originating from a desired position (SP) to be set before a start of a harvesting operation, between an upper end position, which delimits a deflection of the supporting arms in a direction of the crop pick-up device, and a lower end position,
wherein the upper end position has a first clearance and the lower end position has a second clearance from the desired position,
wherein the height control system has a control device that is configured for adapting the desired position (SP), during the harvesting operation, to changing harvesting conditions and/or operating conditions depending on a deflection of the cutterbar, in order to minimize the first clearance and maximize the second clearance.

2. The height control system as claimed in claim 1, wherein the adaptation of the desired position (SP) takes place cyclically during the harvesting operation.

3. The height control system as claimed in claim 1, wherein the first clearance between the desired position (SP) and the upper end position is selected to be greater, the greater the deflection of the cutterbar is as a result of ground unevenness.

4. The height control system as claimed in claim 1, wherein a ratio of the first clearance and of the second clearance with respect to one another relative to the desired position (SP) to be set before the start of a harvesting operation is approximately 1:1 to approximately 1:1.5.

5. The height control system as claimed in claim 4, wherein the first clearance is approximately 90 mm to 115 mm.

6. The height control system as claimed in claim 1, wherein system is configured to reduce the first clearance to approximately 40 mm during the harvesting operation.

7. The height control system as claimed in claim 1, further comprising at least one sensor system situated on the front harvesting attachment, the sensor system being configured to detect the deflection of the cutterbar during the harvesting operation.

8. The height control system as claimed in claim 7, wherein the at least one sensor system is designed as at least one shaft which is rotatably mounted in a bearing point and extends, at least in sections, parallel to the frame, wherein the shaft is connected to one of the supporting arms by a lever system and to at least one sensor for detecting movement conveyed by the lever system onto the shaft.

9. The height control system as claimed in claim 8, further comprising a freewheel disposed at every bearing point, the freewheel providing for a rotation of the shaft only as a result of a deflection of the supporting arm in the direction of the upper end stop.

10. The height control system as claimed in claim 7, wherein the control device is configured for evaluating the deflection detected by the at least one sensor system and for adaptably adjusting the desired position (SP).

11. A self-propelled harvesting machine comprising a front harvesting attachment that is configured to be controlled by a height control system designed as claimed in claim 1.

12. A method for operating a height control system for a front harvesting attachment, wherein the front harvesting attachment comprises a frame, at least one crop pick-up device, and a ground-conforming cutterbar which is situated on a plurality of supporting arms that can pivot about at least one horizontal axis and are articulated on the frame, wherein the supporting arms are connected to an actuating device that is designed to pivot the supporting arms during the harvesting operation, originating from a desired position (SP) which was set before the start of a harvesting operation, between an upper end position, which delimits a deflection of the supporting arms in a direction of the crop pick-up device, and a lower end position, wherein the upper end position has a first clearance and the lower end position has a second clearance from the desired position (SP), the method comprising adapting with a control device the desired position (SP) during the on-going harvesting operation, to changing harvesting conditions and/or operating conditions depending on a deflection of the cutterbar, in order to minimize the first clearance and maximize the second clearance.

13. The method as claimed in claim 12, further comprising the steps of cyclically detecting the deflection of the cutterbar with the aid of at least one sensor system and evaluating the deflection with the control device in order to minimize the first clearance from the desired position (SP) depending on the deflection in a direction of the upper end position.

14. The method as claimed in claim 12, wherein the control device selects the first clearance between the upper end stop and the desired position (SP) based on a degree of unevenness of a territory to be worked, so that the greater the unevenness, the greater the first clearance between the upper end stop and the desired position (SP).

15. The method as claimed in claim 14, wherein the degree of unevenness of a territory to be worked is inferred based on the detected deflection.

* * * * *